United States Patent
Borlick et al.

(10) Patent No.: US 10,606,826 B2
(45) Date of Patent: Mar. 31, 2020

(54) FIXING ANOMALIES IN A PRESERVED DATA STRUCTURE USED TO GENERATE A TEMPORARY DATA STRUCTURE DURING SYSTEM INITIALIZATION

(71) Applicant: INTERNATIONAL BUSINESS MACHINES CORPORATION, Armonk, NY (US)

(72) Inventors: Matthew G. Borlick, Tucson, AZ (US); Lokesh M. Gupta, Tucson, AZ (US); Clint A. Hardy, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 603 days.

(21) Appl. No.: 15/530,189

(22) Filed: Dec. 8, 2016

(65) Prior Publication Data

US 2018/0165322 A1    Jun. 14, 2018

(51) Int. Cl.
*G06F 16/23*     (2019.01)
*G06F 3/06*      (2006.01)
(Continued)

(52) U.S. Cl.
CPC ........ *G06F 16/2365* (2019.01); *G06F 3/0632* (2013.01); *G06F 11/0751* (2013.01); *G06F 11/0793* (2013.01); *G06F 11/1417* (2013.01)

(58) Field of Classification Search
CPC .......... G06F 8/65; G06F 9/4418; G06F 8/658; G06F 11/1433; G06F 11/1441; G06F 11/0736; G06F 11/0751; G06F 11/0772; G06F 11/0793; G06F 11/1004; G06F 11/1417; G06F 11/1448; G06F 16/2365; G06F 8/654; G06F 3/0632; H04L 67/34
(Continued)

(56) References Cited

U.S. PATENT DOCUMENTS

| | | | |
|---|---|---|---|
| 6,341,143 B1 * | 1/2002 | Nelson | G06F 8/65 375/222 |
| 7,191,437 B1 * | 3/2007 | Coatney | G06F 8/65 714/15 |

(Continued)

*Primary Examiner* — Dennis Truong
(74) *Attorney, Agent, or Firm* — David W. Victor; Konrad Raynes Davda & Victor LLP

(57) ABSTRACT

Provided are a computer program product, system, and method for fixing anomalies in a preserved data structure used to generate a temporary data structure during system initialization. A preserved data structure in persistent storage is used to build a temporary data structure in a memory of the computing system during initialization of the computing system. The temporary data structure represents computational resources in the computing system and is rebuilt from the preserved data structure during the initialization. The preserved data structure and the temporary data structure are processed to determine whether the preserved data structure includes at least one anomaly that would result in rebuilding the temporary data structure with an error. Information on the preserved data structure and the temporary data structure having the anomaly are processed to determine modifications to correct the preserved data structure. The determined modifications are processed to correct the preserved data structure.

18 Claims, 5 Drawing Sheets

(51) Int. Cl.
*G06F 11/14* (2006.01)
*G06F 11/07* (2006.01)

(58) Field of Classification Search
USPC .......... 711/103; 717/168, 170, 174; 714/15, 714/23; 707/691; 713/1, 2
See application file for complete search history.

(56) References Cited

U.S. PATENT DOCUMENTS

| | | | | |
|---|---|---|---|---|
| 7,752,617 | B2* | 7/2010 | Blinick | G06F 8/65 717/120 |
| 2003/0066062 | A1* | 4/2003 | Brannock | G06F 8/654 717/169 |
| 2004/0019752 | A1* | 1/2004 | Burton | G06F 3/0607 711/154 |
| 2005/0044348 | A1* | 2/2005 | O'Connell | G06F 9/4418 713/1 |
| 2005/0265266 | A1* | 12/2005 | Wen | H04B 3/56 370/286 |
| 2005/0268029 | A1* | 12/2005 | Wen | H04B 3/56 711/112 |
| 2007/0174603 | A1* | 7/2007 | Wang | G06F 8/65 713/2 |
| 2008/0059785 | A1* | 3/2008 | O'Connell | G06F 9/4418 713/2 |
| 2008/0301358 | A1* | 12/2008 | Wen | G06F 8/65 711/103 |
| 2009/0307677 | A1* | 12/2009 | Long | G06F 8/654 717/168 |
| 2017/0220404 | A1* | 8/2017 | Polar Seminario | G06F 8/654 |

* cited by examiner

FIXING ANOMALIES IN A PRESERVED DATA STRUCTURE USED TO GENERATE A TEMPORARY DATA STRUCTURE DURING SYSTEM INITIALIZATION

BACKGROUND OF THE INVENTION

1. Field of the Invention

The present invention relates to a computer program product, system, and method for fixing anomalies in a preserved data structure used to generate a temporary data structure during system initialization.

2. Description of the Related Art

During a code load operation, system software and/or firmware are updated and the system restarted and initialized with the new code. In certain circumstances, a code load procedure may result in data integrity and data loss issues when the memory is cleared during the restart and re-initialization of the system and configuration information repopulated into the memory. Data integrity issues may arise when system configuration information is rebuilt in the memory from stored and persistent metadata after the code load that includes errors and anomalies.

There is a need in the art to address data integrity and data loss issues when performing a code load operation and re-initialization of the system.

SUMMARY

Provided are a computer program product, system, and method for fixing anomalies in a preserved data structure used to generate a temporary data structure during system initialization. A preserved data structure in persistent storage is used to build a temporary data structure in a memory of the computing system during initialization of the computing system. The temporary data structure represents computational resources in the computing system that are processed during computing system operations. The temporary data structure is rebuilt from the preserved data structure during the initialization. The preserved data structure and the temporary data structure are processed to determine whether the preserved data structure includes at least one anomaly that would result in rebuilding the temporary data structure with an error. Information on the preserved data structure and information on the temporary data structure having the anomaly are processed to determine modifications to correct the preserved data structure. The determined modifications are processed to correct the preserved data structure.

DETAILED DESCRIPTION

During a code load operation, the system may be restarted, resulting in clearing the memory of any temporary data structures used during system operations to provide information on computational resources in the system and storage. Upon re-initialization after code load, when a preserved data structure, stored in persistent non-volatile storage, is used to rebuild the temporary data structures, errors and anomalies in the preserved data structure may result in errors propagated into the temporary data structure rebuilt in the memory. For instance, a rank segment table (RST) has information on segments of extents in storage allocated to data sets in a volume configured in storage. The rank segment table (RST) entries are used to build entries in a volume segment table (VST) providing information on the segments assigned to data sets in the volume. However, if a rank segment table has an anomaly of multiple entries to rebuild one entry in the volume segment table (VST), then errors may occur when the volume segment table is rebuilt from the rank segment table to have multiple entries for one data set which may provide conflicting information for the same data set.

Described embodiments address the above anomalies in rebuilding temporary data structures during system initialization, such as after a code load, by executing a code load script program to correct the anomalies in the preserved data structure, e.g., RST. In one embodiment, during execution of the code load script, multiple entries in the preserved data structure are determined that may be used to rebuild one entry in the temporary data structure, which provides information on a computational resource in the system. Those multiple entries in the preserved data structure providing information to rebuild the same entry in the temporary data structure that do not properly map to the entry in the temporary data structure are identified and removed. After removing the anomalies in the preserved data structure, the code load may be applied to the system, and the system reinitialized with a temporary data structure built from a corrected preserved data structure that does not have anomalies that would introduce errors in the rebuilt temporary data structure.

Figure 1:
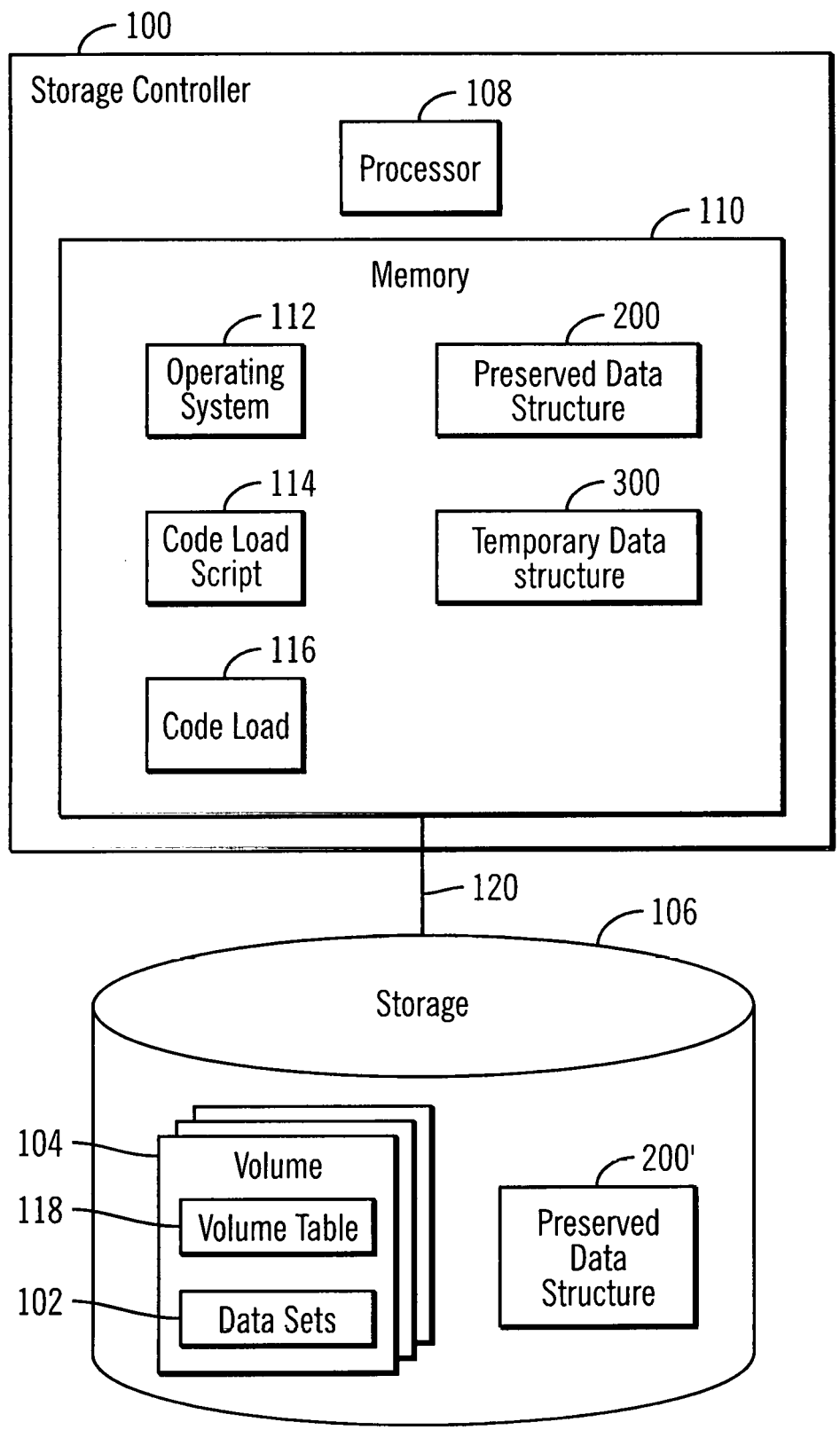
FIG. 1 illustrates an embodiment of a computing environment.

FIG. 1 illustrates an embodiment of a computing environment including a storage controller 100, such as a computing system, system, server or other computing device, that manages access to data sets 102 configured in volumes 104 in a storage 106 by hosts (not shown). A data set 102 comprises a collection of data intended to be stored in a same logical allocation of data, such as data from a single application, user, enterprise, etc. A data set 102 may be comprised of separate files or records, or comprise a single file or record. Each record or file in the data set 102 may be comprised of extents of data or tracks.

The storage controller 100 includes a processor 108 and a memory 110 including an operating system 112 to manage the storage of data sets 102 in the volumes 104. The operating system 112 manages data sets in volumes or other logical data structures.

The operating system 112 may create a preserved data structure 200 that is maintained persistent in the storage 106, which in one example may comprise a rank segment table 200 that includes segments of extents configured in the storage 106 that are assigned to one of the volumes 104. In embodiments where the storage 106 is configured as a Redundant Array of Independent Disks (RAID) array, there may be one rank segment table 200 maintained for each RAID rank configured in the storage 106, where there are multiple extents configured in a RAID rank for which a rank segment table 200 is provided.

The preserved data structure 200 may be used to generate a temporary data structure 300, during system initialization, having system and configuration data used by the operating system 112 during operations. In one embodiment, the temporary data structure 300 may comprise a volume segment table 300 providing information on data set names and segments of extents assigned to a volume 104.

In alternative embodiments, the preserved data structure 200 and temporary data structure 300, generated from the preserved data structure 200, may comprise data structures other than volume related data structures used to provide information on segments of data assigned to volumes. The temporary data structure 300 may have entries to provide information on other computational resources in the system 100 or storage 106. The preserved data structure 200 may comprise a persistent structure that is stored in the non-volatile storage 106 and during system initialization loaded into the memory 110 to use to rebuild the temporary data structure 300, which is processed by the operating system 112 to determine the configuration of computational resources being used by the system 100.

The preserved data structure 200 may include multiple entries, where each entry is used to generate an entry in the temporary data structure 300 identifying a computational resource in the system 100 or storage 106, such as a volume, during system 100 initialization. An anomaly may occur if there are multiple entries in the preserved data structure that have information to build multiple entries in a temporary data structure 300 identifying computational resources in the system. The anomaly may result in system 100 initialization creating multiple entries in the temporary data structure 300 for one computational resource, which may cause system errors.

In one embodiment, each entry in the preserved data structure 200 may be associated with one entry in the temporary data structure, such as having a pointer identifying one entry in the temporary data structure, and each entry in the temporary data structure may be associated with one entry in the preserved data structure, such as having a pointer identifying one entry in the preserved data structure.

An anomaly or error may occur in the preserved data structure if during system 100 operations multiple entries are generated in the preserved data structure 200 that point to one entry in the temporary data structure 300 or multiple entries for one computational resource. If this occurs, during a subsequent system initialization, errors may occur because the preserved data structure may be processed to generate multiple entries in the temporary data structure for one computational resource, which may result in system errors.

The memory 110 may further include a code load script 114 called by the operating system 112 before performing a code load operation of code load 116 to update operating system 112 code and/or system firmware in the storage controller 100, such as an initial machine load (IML) to update the Basic Input/Output System (BIOS) code. The code load operation may result in a rebooting or initializing of the system 100, which would erase the contents of the memory 110, including any temporary data structures 300, which would be rebuilt from the preserved data structures 200 during subsequent re-initialization.

The operating system 112 may maintain a volume table 118 in the volume 104, including a mapping of tracks and extents of tracks to data sets 102, where the extents and segments assigned to data sets 102 are also indicated in a volume segment table 300, comprising a temporary data structure in the memory 110. The volume tables 118 may include information on locations of data sets in the volume 104, such as a mapping of tracks in the data sets to storage locations in the volume. In alternative embodiments, the volume table 118 may comprise other types of file allocation data structures that provide a mapping of data to storage locations, either logical and/or physical storage locations. In this way, the volume table 118 provides a mapping of tracks to data sets 102 in the volume 104.

The storage 106 may comprise one or more storage devices known in the art, such as a solid state storage device (SSD) comprised of solid state electronics, EEPROM (Electrically Erasable Programmable Read-Only Memory), flash memory, flash disk, Random Access Memory (RAM) drive, storage-class memory (SCM), Phase Change Memory (PCM), resistive random access memory (RRAM), spin transfer torque memory (STM-RAM), conductive bridging RAM (CBRAM), magnetic hard disk drive, optical disk, tape, etc. The storage devices may further be configured into an array of devices, such as Just a Bunch of Disks (JBOD), Direct Access Storage Device (DASD), Redundant Array of Independent Disks (RAID) array, virtualization device, etc. Further, the storage devices may comprise heterogeneous storage devices from different vendors or from the same vendor.

The storage controller 100 communicates with the storage 106 via connection 120. The connection 120 may comprise one or more networks, such as a Local Area Network (LAN), Storage Area Network (SAN), Wide Area Network (WAN), peer-to-peer network, wireless network, etc. Alternatively, the connection 120 may comprise bus interfaces, such as a Peripheral Component Interconnect (PCI) bus or serial interface.

Figure 2:
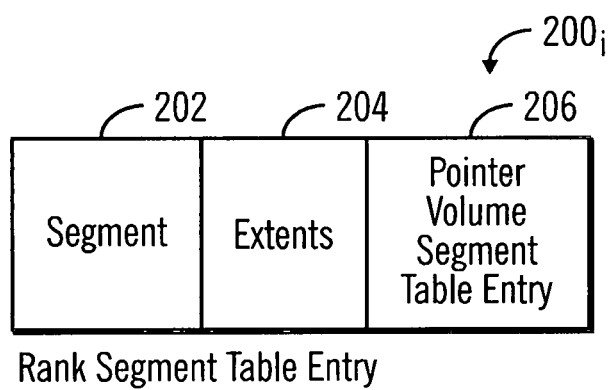
FIG. 2 illustrates an embodiment of a rank segment table entry.

FIG. 2 illustrates an embodiment of an entry $200_i$ in the preserved data structure, comprising a rank segment table, as a rank segment table (RST) entry that identifies a segment 202 comprising one or more extents 204 configured in the storage 106, and a pointer to a volume segment table (VST) entry 206 identifying a data set to which the segment 202 is assigned. In alternative embodiments, the preserved data structure may provide information for other types of computational resources.

Figure 3:
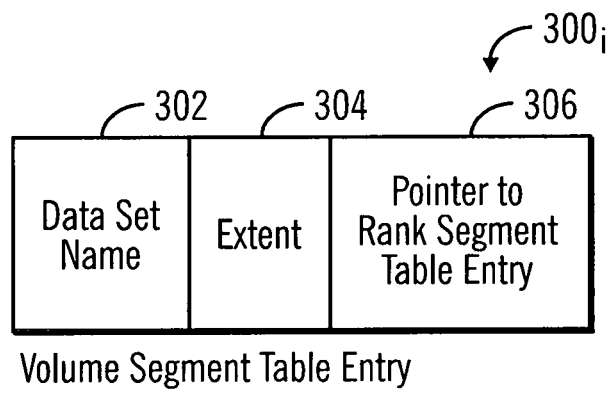
FIG. 3 illustrates an embodiment of a volume segment table entry.

FIG. 3 illustrates an embodiment of an entry $300_i$ in the temporary data structure, comprising a volume segment table, as a volume segment table (VST) entry having a data set name 302, extents 304 assigned to the data set 302 in the volume, and a pointer 306 to a rank segment table entry $200_i$ from which the entry $300_i$ was built. In alternative embodiments, the temporary data structure may provide information for other types of computational resources than volume table entries.

The data sets 302 configured in a volume 104 identified in the volume segment table entries $300_i$ may comprise extents allocated from segments 202 of extents 204 identified in the rank segment table entries $200_i$ allocated extents. Tracks may be stored in extents, which provide a mapping or grouping of tracks or other data units in the volume 104.

In one embodiment, the preserved data structure 200 and temporary data structure 300 are described as tables having entries. In alternative embodiments, the entries of the data structures may comprise separate objects, where one preserved data object is used to build one temporary data object during system initialization, where each temporary data object would represent a computational resource.

Figure 4:
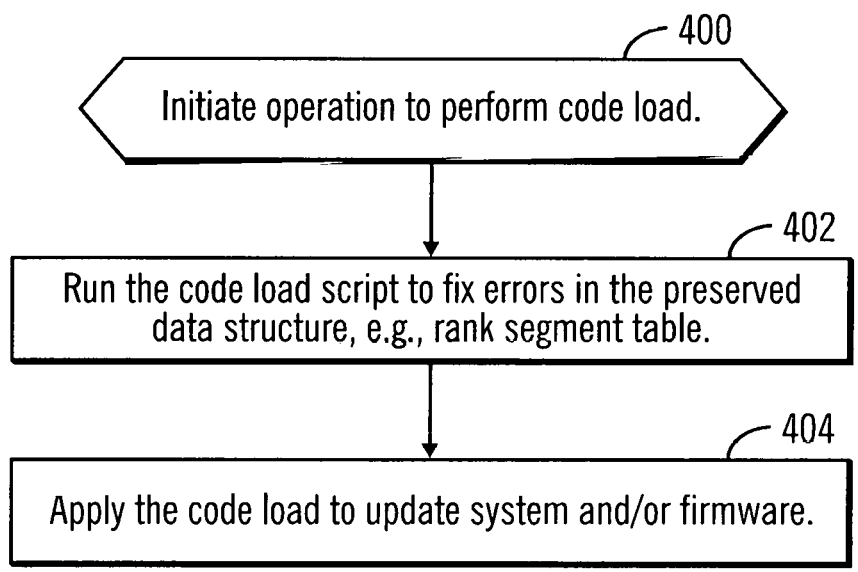
FIG. 4 illustrates an embodiment of operations to perform apply a code load.

FIG. 4 illustrates an embodiment of operations performed by the operating system 112 to perform a code load operation to apply the code load 116 to the system 100. Upon initiating a code load of the code load 116, the operating system 112 calls (at block 402) the code load script 114 to correct errors and anomalies in a preserved data structure 200, such as a rank segment table. The errors and anomalies in the preserved data structure may result in rebuilding of the temporary data structure 300 with errors. After fixing the preserved data structure by removing the anomalies in the preserved data structure 200, such as ensuring there Is only one entry in the preserved data structure 200 associated with one entry in the temporary data structure 300, the operating system 112 applies (at block 404) the code load 116 to update system 100 code and/or firmware of the system 100 or storage 106. The applying of the code load 116 would result in reinitialization of the operating system 112, clearing of the memory 110, and rebuilding the temporary data structure 300 from the fixed preserved data structure 200 in the memory 110.

Figure 5:
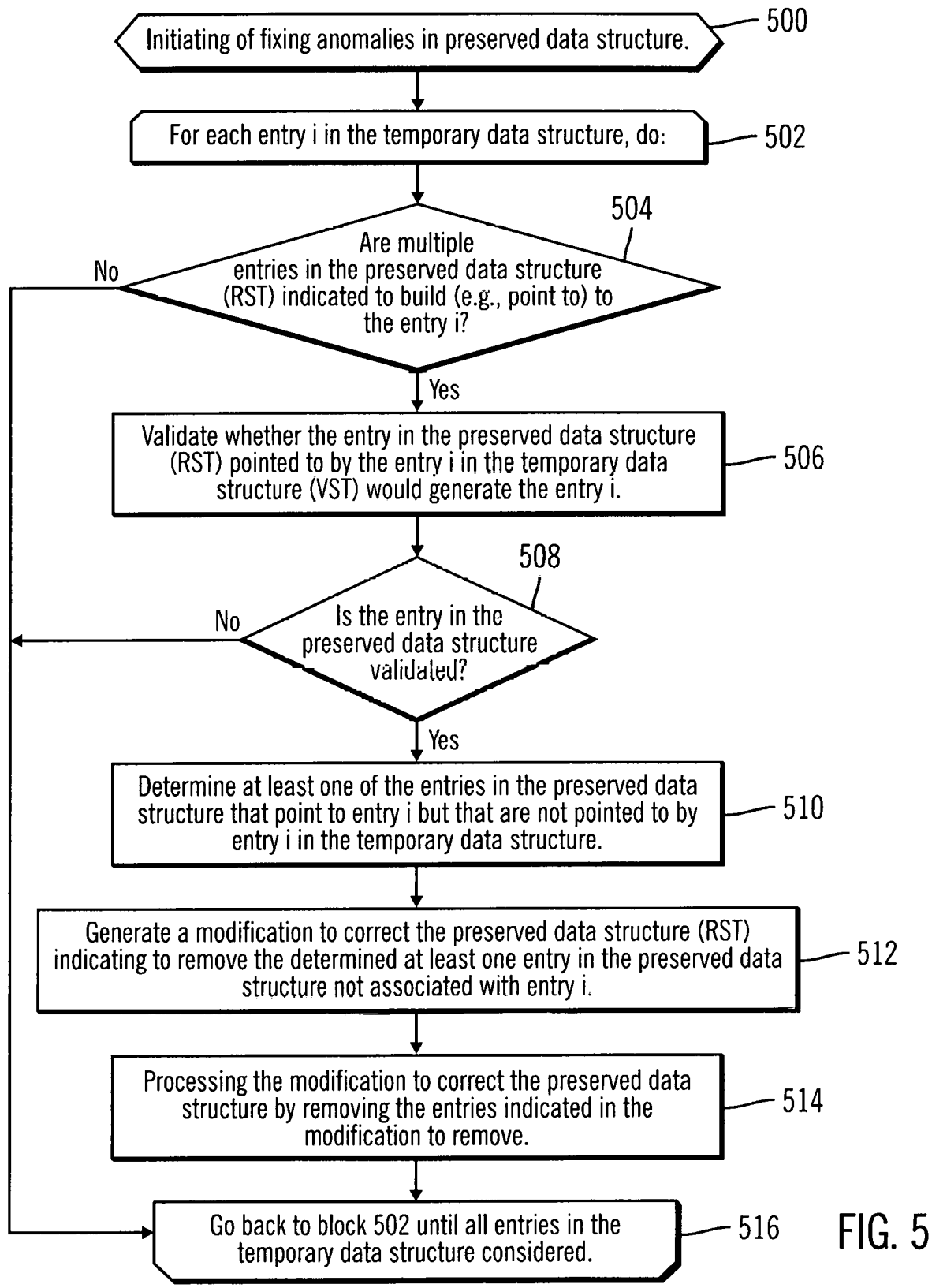
FIG. 5 illustrates an embodiment of operations to fix anomalies in a preserved data structure used to generate a temporary data structure in memory after code load and re-initialization.

FIG. 5 illustrates an embodiment of operations performed by the operating system 112 to correct errors and anomalies in the preserved data structure 200 before applying the code load 116, which may be performed at block 402 in FIG. 4. Upon initiating (at block 500) operations to fix anomalies in the preserved data structure 300, a loop of operations is performed at blocks 502 through 516 for each entry $300_i$ in the temporary data structure 300 generated from one entry $200_i$ the preserved data structure 200. The operating system 112 determines (at block 504) whether there are multiple entries in the preserved data structure 200, e.g., Rank Segment Table (RST), that are used to build entry $300_i$, e.g., there are multiple entries $200_i$ having a pointer 206 that point to entry $300_i$ in the temporary data structure (e.g., volume segment table (VST)). If (at block 504) there are multiple entries $200_i$ that point to entry $300_i$, then the operating system 112 validates (at block 506) the entry $200_i$ in the preserved data structure $200_i$ pointed to by the entry $300_i$ in the temporary data structure being considered.

If (at block 508) entry $300_i$ in the temporary data structure is validated from the validated entry $200_i$ from the preserved data structure, then the operating system 112 determines (at block 510) at least one of the entries $200_j$ in the preserved data structure 200 that point to entry $300_i$ in the temporary data structure 300, but that are not pointed to by entry $300_i$ in the temporary data structure 300. The operating system 112 then generates (at block 512) a modification to correct the preserved data structure 200 that indicates to remove the determined at least one $200_j$ entry in the preserved data structure 200 not associated with, e.g., not pointed to, by entry $300_i$. The operating system 112 processes (at block 514) the determined modification to correct the preserved data structure 200 by removing the $200_i$ entries indicated in the modification to remove.

If (at block 504) there are not multiple entries in the preserved data structure 200 for entry $300_i$ or if (at block 508) the entry $200_i$ in the preserved data structure 200 is not validated, then control proceeds to block 516 to consider the next entry $300_i$ in the temporary data structure 300. If (at block 508) the entry is not validated, then another level of correction operations may be performed to reconstruct the correct entry $200_i$ in the preserved data structure 200 for the entry $300_i$ in the temporary data structure 300 being considered, or unresolved problems with entries in the preserved data structure 300 may be reported to an administrator or user to correct.

In the embodiment of FIG. 5, entries in the preserved data structure are selected for removal if the corresponding entry in the temporary data structure to which they map are not pointed to by the entry in the temporary data structure, or not used to build the entry in the temporary data structure. In alternative embodiments, different techniques may be used to determine which preserved data structure entries associated with temporary data structure entries are invalid and should be removed. For instance, information in the entries in the preserved data structure may be processed to determine if they are the entry that was used to build an entry in the temporary data structure, and those not having information consistent with the entries in the temporary data structure may be removed to avoid data integrity problems in rebuilding the temporary data structure. In further alternative embodiments, there may be multiple entries in the preserved data structure that are used to build (or associated with) one or more entries in the temporary data structure. In such embodiments, different techniques may be used to determine those entries in the preserved data structure having errors and to correct or remove those entries having anomalies.

With the described embodiments, the operating system 112 executes the code load script 114 to remove anomalies from the preserved data structure 200 that could result in generating a temporary data structure with errors after initializing the system with the new code load 116 applied in the system 100. In alternative embodiments, the described embodiments may be used to correct anomalies in preserved data structures used to generate temporary data structures in contexts other than a code load operation, such as before initializing the memory with temporary data structures, during system operations, etc.

The reference characters used herein, such as i and j, are used to denote a variable number of instances of an element, which may represent the same or different values, and may represent the same or different value when used with different or the same elements in different described instances.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 6:
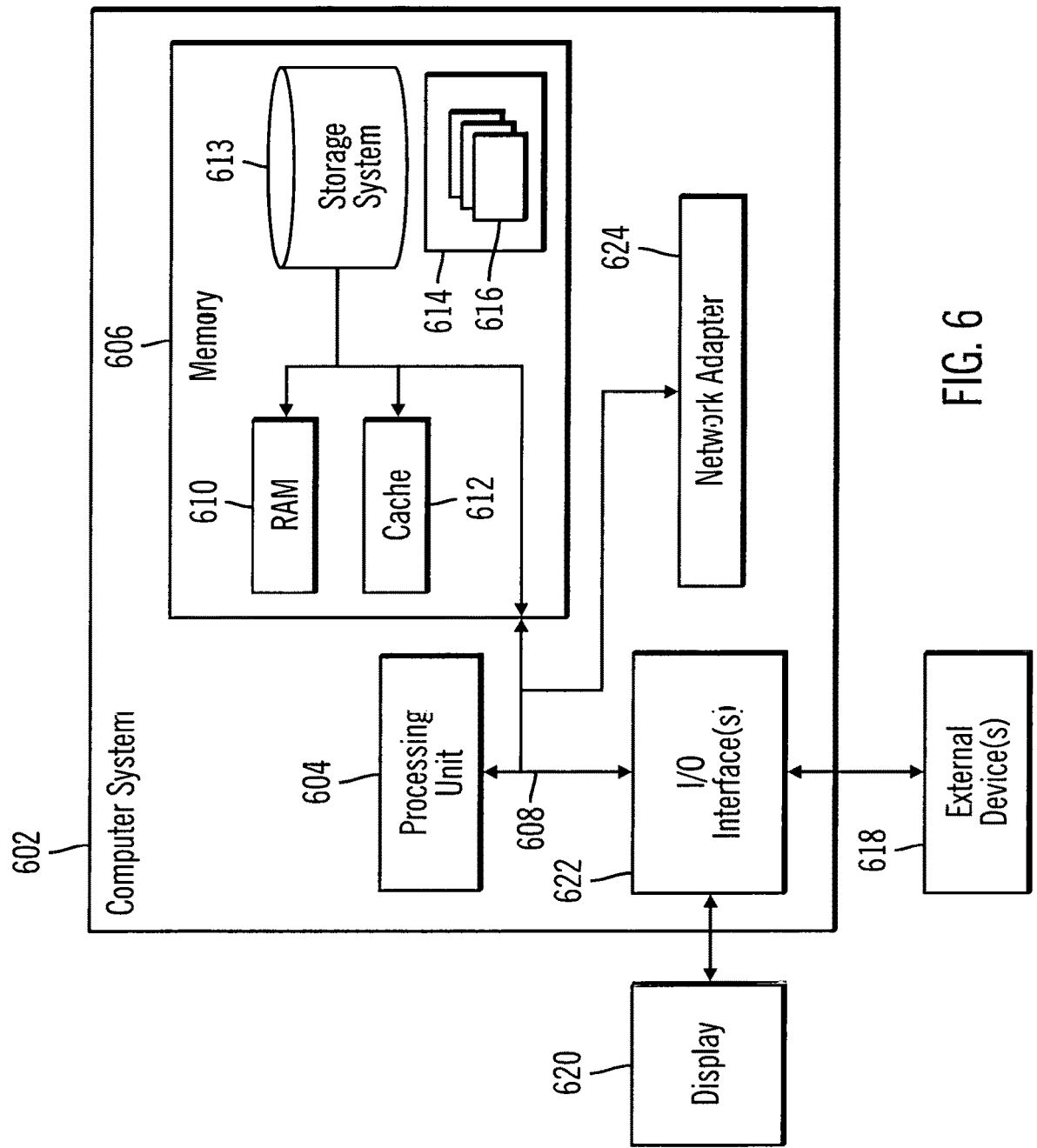
FIG. 6 illustrates a computing environment in which the components of FIG. 1 may be implemented.

The computational components of FIG. 1, including the storage controller 100, may be implemented in one or more computer systems, such as the computer system 602 shown in FIG. 6. Computer system/server 602 may be described in the general context of computer system executable instructions, such as program modules, being executed by a computer system. Generally, program modules may include routines, programs, objects, components, logic, data structures, and so on that perform particular tasks or implement particular abstract data types. Computer system/server 602 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, the computer system/server 602 is shown in the form of a general-purpose computing device. The components of computer system/server 602 may include, but are not limited to, one or more processors or processing units 604, a system memory 606, and a bus 608 that couples various system components including system memory 606 to processor 604. Bus 608 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 602 typically includes a variety of computer system readable media. Such media may be any available media that is accessible by computer system/server 602, and it includes both volatile and non-volatile media, removable and non-removable media.

System memory 606 can include computer system readable media in the form of volatile memory, such as random access memory (RAM) 610 and/or cache memory 612. Computer system/server 602 may further include other removable/non-removable, volatile/non-volatile computer system storage media. By way of example only, storage system 613 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 608 by one or more data media interfaces. As will be further depicted and described below, memory 606 may include at least one program product having a set (e.g., at least one) of program modules that are configured to carry out the functions of embodiments of the invention.

Program/utility 614, having a set (at least one) of program modules 616, may be stored in memory 606 by way of example, and not limitation, as well as an operating system, one or more application programs, other program modules, and program data. Each of the operating system, one or more application programs, other program modules, and program data or some combination thereof, may include an implementation of a networking environment. The components of the computer 602 may be implemented as program modules 616 which generally carry out the functions and/or methodologies of embodiments of the invention as described herein. The systems of FIG. 1 may be implemented in one or more computer systems 602, where if they are implemented in multiple computer systems 602, then the computer systems may communicate over a network.

Computer system/server 602 may also communicate with one or more external devices 618 such as a keyboard, a pointing device, a display 620, etc.; one or more devices that enable a user to interact with computer system/server 602; and/or any devices (e.g., network card, modem, etc.) that enable computer system/server 602 to communicate with one or more other computing devices. Such communication can occur via Input/Output (I/O) interfaces 622. Still yet, computer system/server 602 can communicate with one or more networks such as a local area network (LAN), a general wide area network (WAN), and/or a public network (e.g., the Internet) via network adapter 624. As depicted, network adapter 624 communicates with the other components of computer system/server 602 via bus 608. It should be understood that although not shown, other hardware and/or software components could be used in conjunction with computer system/server 602. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for managing information on computational resources in a computing system, wherein the computer program product comprises a computer readable storage medium having program instructions embodied therewith, the program instructions executable by a processor to cause operations, the operations comprising:

maintaining a preserved data structure in persistent storage that is used to build a temporary data structure in a memory of the computing system during initialization of the computing system, wherein the temporary data structure represents computational resources in the computing system that are processed during computing system operations, wherein the temporary data structure is rebuilt from the preserved data structure during the initialization, wherein the preserved data structure includes a plurality of entries, wherein each entry in the preserved data structure includes information used to build entries in the temporary data structure during initialization, wherein each entry built in the temporary data structure represents one of the computational resources in the computing system, and wherein each entry in the temporary data structure is associated with one of the entries in the preserved data structure;

determining an anomaly that would result in rebuilding the temporary data structure with an error in response to determining there are multiple entries in the preserved data structure associated with one entry in the temporary data structure;

processing information on the preserved data structure and information on the temporary data structure having the anomaly to determine modifications to correct the preserved data structure; and processing the determined modifications to correct the preserved data structure.

2. The computer program product of claim 1, wherein the operations further comprise:

initiating a code load operation to upload a new code level in response to correcting the preserved data structure.

3. The computer program product of claim 1, wherein each entry in the temporary data structure points to the entry in the preserved data structure used to build the entry in the temporary data structure during initialization, wherein the processing the information on the preserved data structure and information on the temporary data structure to determine the modifications comprises:

determining at least two entries in the preserved data structure that point to one determined entry in the temporary data structure; and determining at least one of the entries in the preserved data structure that point to the preserved data structure that is not pointed to by the determined entry in the temporary data structure, wherein the processing the determined modifications comprises removing the determined at least one of the entries in the preserved data structure not pointed to by the determined entry in the temporary data structure.

4. The computer program product of claim 3, wherein the operations further comprise:

validating whether the entry in the preserved data structure pointed to by the determined entry in the temporary data structure would generate the determined entry in the temporary data structure, wherein the removing the determined at least one of the entries in the preserved data structure is performed in response to the validating the entry in the preserved data structure.

5. The computer program product of claim 1, wherein the computing system comprises a storage controller managing access to volumes in a storage, wherein the preserved data structure comprises a rank segment table having entries and the temporary data structure comprises a volume segment table having entries, wherein each entry in the volume segment table identifies extents of tracks assigned to one of the volumes represented by the volume segment table, wherein each entry in the volume segment table points to one segment entry in the rank segment table and wherein each entry in the rank segment table points to the entry in the volume segment table that the entry in the rank segment table is used to build, wherein the anomaly occurs when multiple entries in the rank segment table points to two one entry in the volume segment table.

6. The computer program product of claim 5, wherein the processing the information on the rank segment table and information on the volume segment table to determine modifications to correct the preserved data structure comprises:

determining a plurality of the entries in the rank segment table that point to one determined entry in the volume segment table; and determining at least one of the determined entries in the rank segment table that is not pointed to by the determined entry in the volume segment table, wherein the processing the determined modifications comprise removing the determined at least one of the entries in the rank segment table not pointed to by the determined entry in the volume segment table.

7. A system comprising:

a processor;

a memory device; and a computer readable storage medium having program instructions executable by a processor to cause operations, the operations comprising:

maintaining a preserved data structure in persistent storage that is used to build a temporary data structure in the memory device during initialization of the system, wherein the temporary data structure represents computational resources in the system that are processed during computing system operations, wherein the temporary data structure is rebuilt from the preserved data structure during the initialization, wherein the preserved data structure includes a plurality of entries, wherein each entry in the preserved data structure includes information used to build entries in the temporary data structure during initialization, wherein each entry built in the temporary data structure represents one of the computational resources in the system, and wherein each entry in the temporary data structure is associated with one of the entries in the preserved data structure;

determining an anomaly that would result in rebuilding the temporary data structure with an error in response to determining there are multiple entries in the preserved data structure associated with one entry in the temporary data structure;

processing information on the preserved data structure and information on the temporary data structure having the anomaly to determine modifications to correct the preserved data structure; and processing the determined modifications to correct the preserved data structure.

8. The system of claim 7, wherein the operations further comprise:

initiating a code load operation to upload a new code level in response to correcting the preserved data structure.

9. The system of claim 7, wherein each entry in the temporary data structure points to the entry in the preserved data structure used to build the entry in the temporary data structure during initialization, wherein the processing the information on the preserved data structure and information on the temporary data structure to determine the modifications comprises:

determining at least two entries in the preserved data structure that point to one determined entry in the temporary data structure; and determining at least one of the entries in the preserved data structure that point to the preserved data structure that is not pointed to by the determined entry in the temporary data structure, wherein the processing the determined modifications comprises removing the determined at least one of the entries in the preserved data structure not pointed to by the determined entry in the temporary data structure.

10. The system of claim 9, wherein the operations further comprise:

validating whether the entry in the preserved data structure pointed to by the determined entry in the temporary data structure would generate the determined entry in the temporary data structure, wherein the removing the determined at least one of the entries in the preserved data structure is performed in response to the validating the entry in the preserved data structure.

11. The system of claim 7, further including:
a storage in which volumes are configured, wherein the preserved data structure comprises a rank segment table having entries and the temporary data structure comprises a volume segment table having entries, wherein each entry in the volume segment table identifies extents of tracks assigned to one of the volumes represented by the volume segment table, wherein each entry in the volume segment table points to one segment entry in the rank segment table and wherein each entry in the rank segment table points to the entry in the volume segment table that the entry in the rank segment table is used to build, wherein the anomaly occurs when multiple entries in the rank segment table points to two one entry in the volume segment table.

12. The system of claim 11, wherein the processing the information on the rank segment table and information on the volume segment table to determine modifications to correct the preserved data structure comprises:
determining a plurality of the entries in the rank segment table that point to one determined entry in the volume segment table; and
determining at least one of the determined entries in the rank segment table that is not pointed to by the determined entry in the volume segment table, wherein the processing the determined modifications comprise removing the determined at least one of the entries in the rank segment table not pointed to by the determined entry in the volume segment table.

13. A method for managing information on computational resources in a computing system, comprising:
maintaining a preserved data structure in persistent storage that is used to build a temporary data structure in a memory of the computing system during initialization of the computing system, wherein the temporary data structure represents computational resources in the computing system that are processed during computing system operations, wherein the temporary data structure is rebuilt from the preserved data structure during the initialization wherein the preserved data structure includes a plurality of entries, wherein each entry in the preserved data structure includes information used to build entries in the temporary data structure during initialization, wherein each entry built in the temporary data structure represents one of the computational resources in the computing system, and wherein each entry in the temporary data structure is associated with one of the entries in the preserved data structure;
determining an anomaly that would result in rebuilding the temporary data structure with an error in response to determining there are multiple entries in the preserved data structure associated with one entry in the temporary data structure;
processing information on the preserved data structure and information on the temporary data structure having the anomaly to determine modifications to correct the preserved data structure; and
processing the determined modifications to correct the preserved data structure.

14. The method of claim 13, further comprising:
initiating a code load operation to upload a new code level in response to correcting the preserved data structure.

15. The method of claim 13, wherein each entry in the temporary data structure points to the entry in the preserved data structure used to build the entry in the temporary data structure during initialization, wherein the processing the information on the preserved data structure and information on the temporary data structure to determine the modifications comprises:
determining at least two entries in the preserved data structure that point to one determined entry in the temporary data structure; and
determining at least one of the entries in the preserved data structure that point to the preserved data structure that is not pointed to by the determined entry in the temporary data structure, wherein the processing the determined modifications comprises removing the determined at least one of the entries in the preserved data structure not pointed to by the determined entry in the temporary data structure.

16. The method of claim 15, wherein the operations further comprise:
validating whether the entry in the preserved data structure pointed to by the determined entry in the temporary data structure would generate the determined entry in the temporary data structure, wherein the removing the determined at least one of the entries in the preserved data structure is performed in response to the validating the entry in the preserved data structure.

17. The method of claim 13, wherein the computing system comprises a storage controller managing access to volumes in a storage, wherein the preserved data structure comprises a rank segment table having entries and the temporary data structure comprises a volume segment table having entries, wherein each entry in the volume segment table identifies extents of tracks assigned to one of the volumes represented by the volume segment table, wherein each entry in the volume segment table points to one segment entry in the rank segment table and wherein each entry in the rank segment table points to the entry in the volume segment table that the entry in the rank segment table is used to build, wherein the anomaly occurs when multiple entries in the rank segment table points to two one entry in the volume segment table.

18. The method of claim 17, wherein the processing the information on the rank segment table and information on the volume segment table to determine modifications to correct the preserved data structure comprises:
determining a plurality of the entries in the rank segment table that point to one determined entry in the volume segment table; and
determining at least one of the determined entries in the rank segment table that is not pointed to by the determined entry in the volume segment table, wherein the processing the determined modifications comprise removing the determined at least one of the entries in the rank segment table not pointed to by the determined entry in the volume segment table.

* * * * *